US011443653B2

(12) United States Patent
Hong et al.

(10) Patent No.: US 11,443,653 B2
(45) Date of Patent: Sep. 13, 2022

(54) METHOD AND SYSTEM FOR SKILL LEARNING

(71) Applicant: National Taiwan Normal University, Taipei (TW)

(72) Inventors: Jon-Chao Hong, Taipei (TW); Kai-Hsin Tai, Taipei (TW); Jian-Hong Ye, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 433 days.

(21) Appl. No.: 16/594,738

(22) Filed: Oct. 7, 2019

(65) Prior Publication Data

US 2020/0388189 A1 Dec. 10, 2020

(30) Foreign Application Priority Data

Jun. 6, 2019 (TW) .................................. 108119662

(51) Int. Cl.
G09B 19/00 (2006.01)
G06F 3/01 (2006.01)
G09B 5/02 (2006.01)
G09B 19/24 (2006.01)
G06F 3/0482 (2013.01)

(52) U.S. Cl.
CPC ........... G09B 19/003 (2013.01); G06F 3/017 (2013.01); G06F 3/0482 (2013.01); G09B 5/02 (2013.01); G09B 19/24 (2013.01)

(58) Field of Classification Search
CPC ........ G09B 19/003; G09B 5/02; G09B 19/24; G06F 3/107; G06F 3/0482; G06F 3/017
See application file for complete search history.

(56) References Cited

U.S. PATENT DOCUMENTS

| 9,741,169 | B1* | 8/2017 | Holz | G02B 27/0172 |
| 2013/0101968 | A1* | 4/2013 | Grabenstetter | G09B 5/06 434/63 |
| 2016/0314624 | A1* | 10/2016 | Li | G06F 3/012 |
| 2018/0263535 | A1* | 9/2018 | Cramer | A61B 5/7475 |
| 2019/0259294 | A1* | 8/2019 | Woods | G06T 19/003 |
| 2019/0304188 | A1* | 10/2019 | Bridgeman | G09B 19/003 |
| 2019/0318640 | A1* | 10/2019 | Goel | A61B 90/36 |
| 2020/0030651 | A1* | 1/2020 | Choi | A62C 99/0081 |

FOREIGN PATENT DOCUMENTS

CN 109658516 A 4/2019

OTHER PUBLICATIONS

Taiwanese Search Report for Taiwanese Application No. 108119662, dated Mar. 16, 2020, with an English translation.

* cited by examiner

Primary Examiner — William L Bashore
Assistant Examiner — Gregory A Distefano
(74) Attorney, Agent, or Firm — Birch, Stewart, Kolasch & Birch, LLP

(57) ABSTRACT

A method for skill learning is implemented using a system including a wearable device to be worn by a user, a storage unit, and a processor communicating with the wearable device and the storage unit. The storage unit stores a plurality of virtual reality modules in the storage unit, each of the virtual reality modules containing interactive data associated with learning a skill. The method includes: accessing the storage unit to load a selected one of the virtual reality modules; and controlling the wearable device to present the interactive data contained in the selected one of the virtual reality modules to the user in the form of a virtual environment.

12 Claims, 11 Drawing Sheets

METHOD AND SYSTEM FOR SKILL LEARNING

CROSS-REFERENCE TO RELATED APPLICATION

This application claims priority of Taiwanese Patent Application No. 108119662, filed on Jun. 6, 2019.

FIELD

The disclosure relates to a method and a system for skill learning, particularly to a method and a system that provide a virtual environment for assisting a user in skill learning.

BACKGROUND

Conventionally, a skill (e.g., carwashing, cooking, juggling, sports, dancing, etc.) may be learned from a teacher (e.g., an experienced artisan) providing lessons in a one-on-one or one-to-many manner. The teacher may first demonstrate the skill for one or more learners, and the learner(s) may attempt to perform the skill after watching the demonstration. Any error that occurs during the performance may then be corrected by the teacher.

It is noted that such a conventional way of learning may have limitations in the aspects of time and space.

SUMMARY

Therefore, one object of the disclosure is to provide a method that provides a virtual environment for assisting skill learning by a user.

According to one embodiment of the disclosure, the method for skill learning is implemented using a system including a wearable device worn by a user, a storage unit, and a processor communicating with the wearable device and the storage unit. The storage unit stores a plurality of virtual reality modules therein, each of the virtual reality modules containing interactive data associated with learning a skill. The method includes:

accessing, by the processor, the storage unit to load a selected one of the virtual reality modules; and controlling, by the processor, the wearable device to present the interactive data contained in the selected one of the virtual reality modules to the user in the form of a virtual environment.

Another object of the disclosure is to provide a system that is configured to implement the above-mentioned method.

According to one embodiment of the disclosure, the system includes a wearable device to be worn by a user, a storage unit storing a plurality of virtual reality modules therein, and a processor communicating with the wearable device and the storage unit. Each of the virtual reality modules contains interactive data associated with learning a skill.

The processor is configured to access the storage unit to load a selected one of the virtual reality modules, and control the wearable device to present the interactive data contained in the selected one of the virtual reality modules to the user in the form of a virtual environment.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
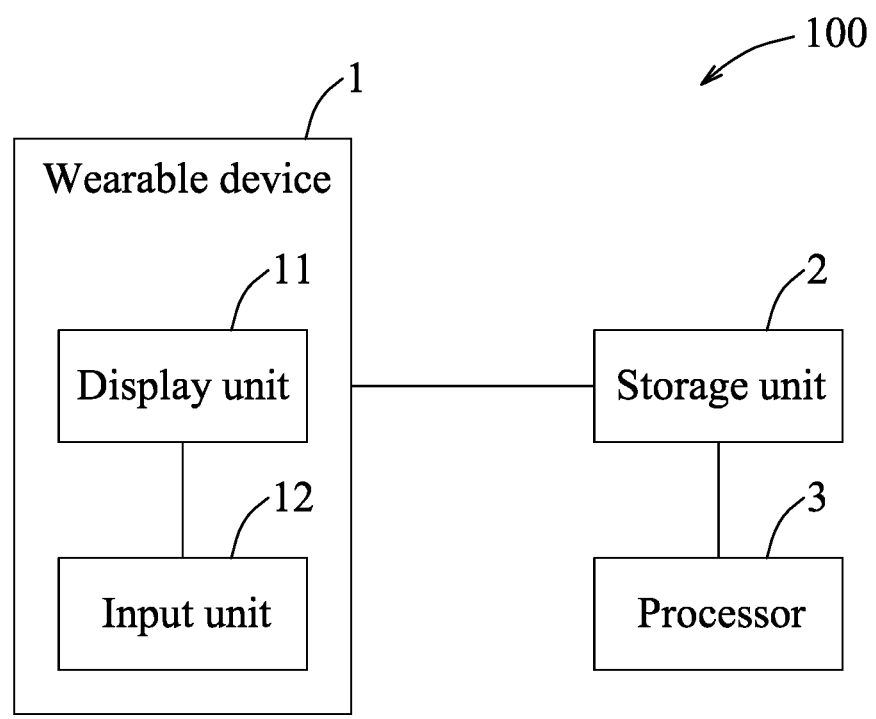
FIG. 1 is a block diagram illustrating a system for skill learning according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating a system 100 for skill learning according to one embodiment of the disclosure.

The system 100 includes a wearable device 1 to be worn by a user, a storage unit 2, and a processor 3 communicating with the wearable device 1 and the storage unit 2.

In this embodiment, the wearable device 1 includes a display unit 11 and an input unit 12. The display unit 11 may be embodied using a headset such as a virtual reality (VR) headset to be worn on the head of the user. The input unit 12 may be embodied using a set of handheld devices that includes two devices in the form of sticks to be held by two hands of the user, or other sensing apparatuses attached to the hands and/or legs of the user.

Each of the handheld devices may include an input button pad (that includes, for example, a D-pad, an enter button, etc.) for allowing the user to input a command, and a motion detecting element (e.g., an accelerometer, a plurality of motion sensors, etc.), and the set of handheld devices may serve as a motion controller. That is to say, the input unit 12 is configured to be capable of detecting motion and gesture of the hands of the user holding the input unit 12.

The storage unit 3 may be embodied using a hard disk drive, flash memory, a cloud storage server, or other forms of non-transitory storage medium.

In this embodiment, the storage unit 3 stores a software application and a plurality of virtual reality modules therein. Specifically, each of the virtual reality modules may be in the form of a software program module containing interactive data associated with learning a particular skill.

The processor 2 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (FDIC), etc.

It is noted that in some embodiments, the processor 2 and the storage unit 3 may be integrated with the wearable device 1. In other embodiments, the processor 2 and the storage unit 3 may be embodied using a computer device other than the wearable device 1 (e.g., a server, a personal computer, a laptop, a tablet, etc.) that includes a communicating component (not shown in the drawings) to communicate with the wearable device 1, which may also include a similar communicating component. The communicating component may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The software application includes instructions that, when executed by the processor 2, causes the processor 2 to control the wearable device 1 to perform a number of operations related to a method for skill learning according to one embodiment of the disclosure.

Figure 11:
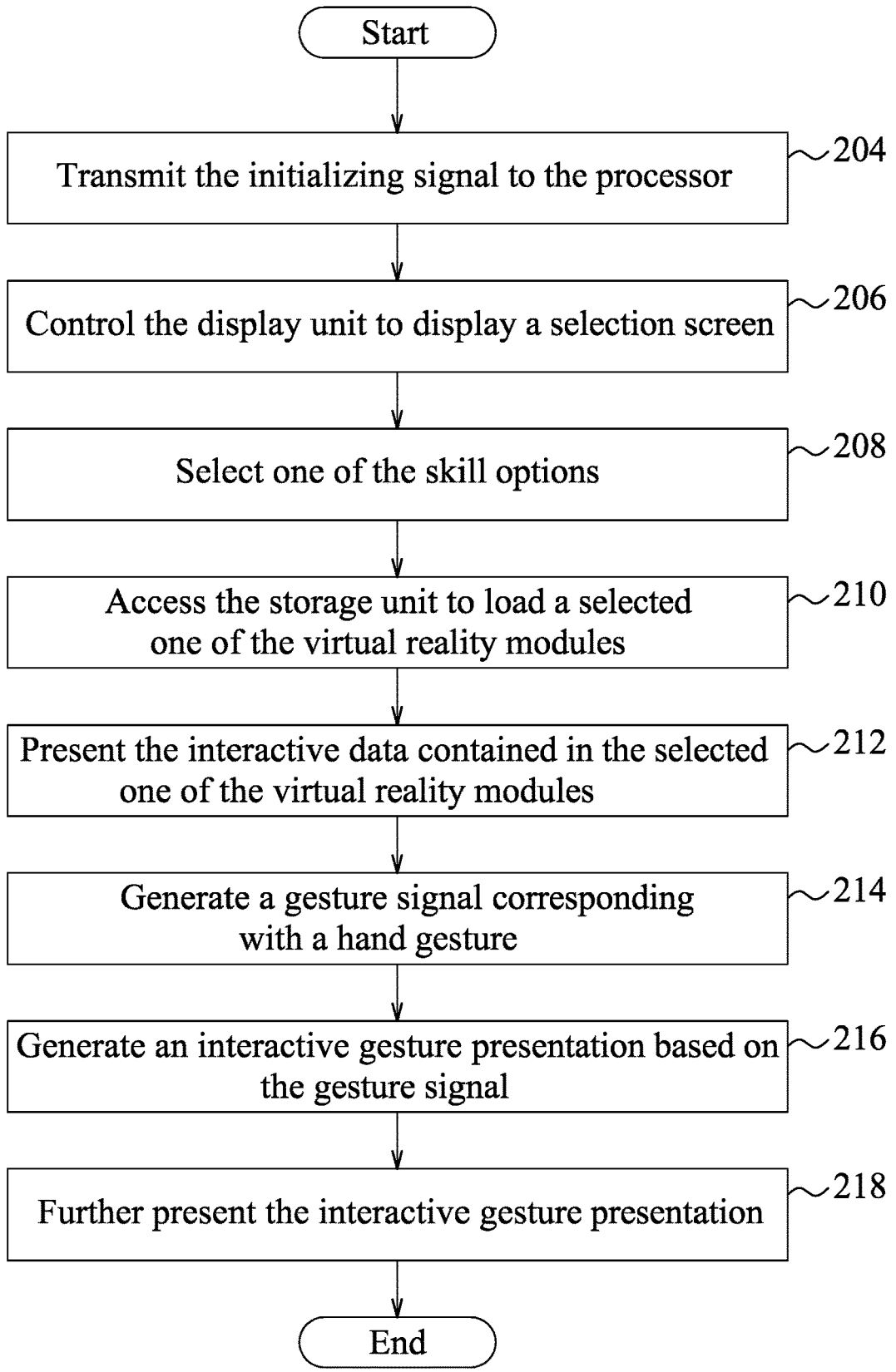
FIG. 11 is a flow chart illustrating steps of a method for skill learning according to one embodiment of the disclosure.

FIG. 11 is a flow chart illustrating steps of the method for skill learning according to one embodiment of the disclosure. It is noted that, prior to performing the method, a number of virtual reality modules are pre-stored in the storage unit 3. Each of the virtual reality modules contains interactive data associated with learning a skill (e.g., food prepping, car washing, etc.).

In this embodiment, each of the virtual reality modules may include a practice sub-module corresponding with a practice mode, and an evaluation sub-module corresponding with an evaluation mode. The practice sub-module contains interactive data that includes a cognitive scaffolding network. The cognitive scaffolding network includes a plurality of scaffolding elements and is for providing guidance (such as a visually perceivable instruction) when the user is practicing a skill.

In step 204, when a user wears the wearable device 1 (e.g., puts the display unit 11 on his/her head and holds the handheld device of the input unit 12 in his/her hands), the user may operate the input unit 12 to generate an initializing signal (e.g., by pressing a button on the input unit 12 or holding a specific gesture with his/her hands), and then the initializing signal is transmitted to the processor 2.

Figure 2:
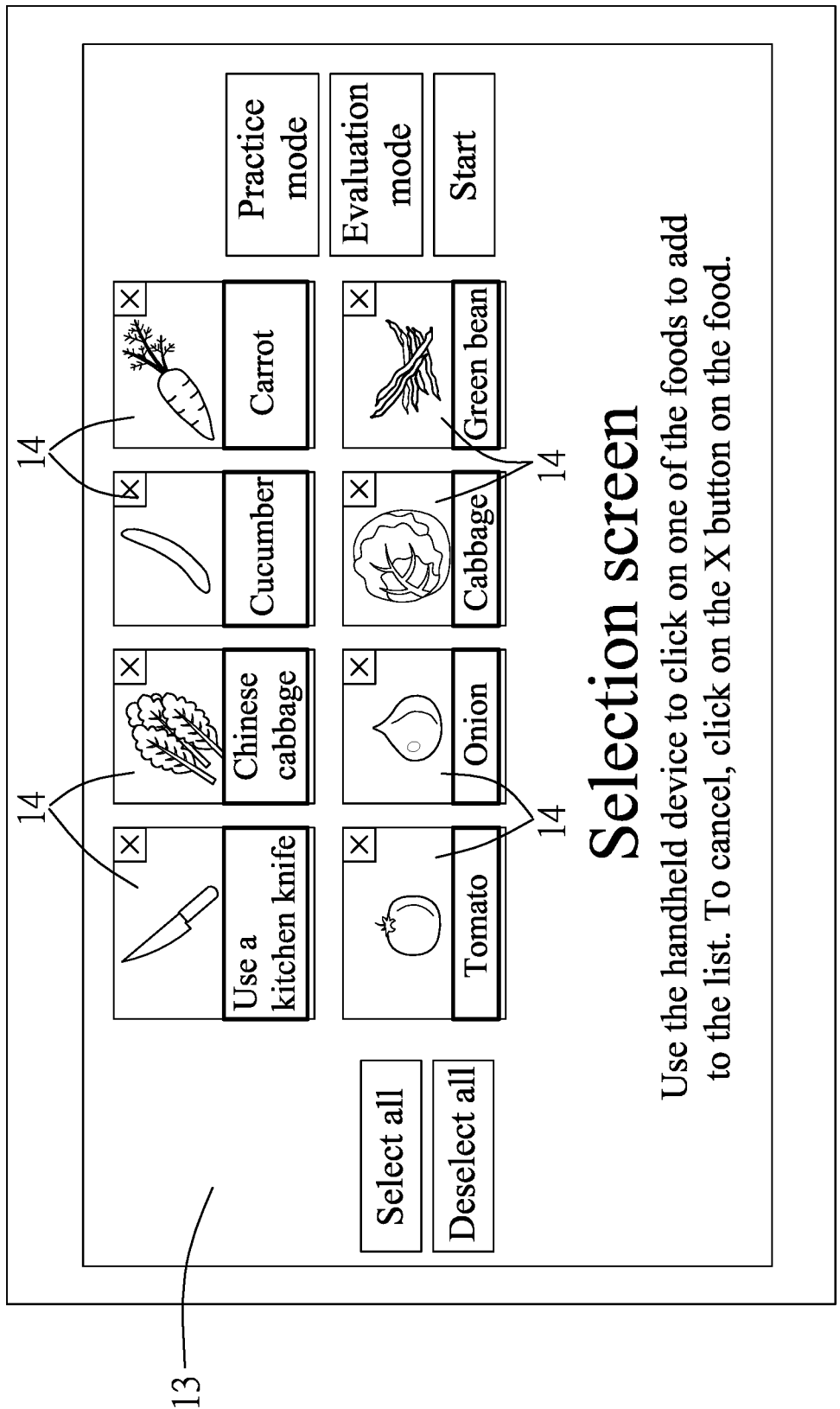
FIG. 2 is a schematic view illustrating a selection screen presented by a display unit of the system.

In step 206, in response to the initializing signal, the processor 2 controls the display unit 11 to display a selection screen 13 (see FIG. 2).

As shown in FIG. 2, the selection screen 13 includes a plurality of skill options 14 each corresponding with a skill, and a plurality of mode options 15 each corresponding with an operation mode. For example, the operation modes corresponding with the mode options 15 include the practice mode and the evaluation mode.

In this embodiment, each of the skill options 14 corresponds with preparing a particular kind of food on a cutting board using a kitchen knife. Several kinds of foods may be available for selection, such as leaf vegetable (e.g., Chinese cabbage), vegetables that do not require peeling (e.g., cucumber), vegetables that require peeling (e.g., carrot), round shaped vegetables (e.g., tomato, onion, cabbage, etc.), strip shaped vegetables (e.g., green bean), etc.

In step 208, the user operates the input unit 12 to select one of the skill options 14 to practice preparing one of the foods. In addition, the user operates the input unit 12 to select one of the mode options 15 to select either the practice mode or the evaluation mode.

In one example, the user may move one hand (holding the handheld device of the input unit 12) to control movement of a cursor to move to one of the skill options 14, and click the enter button on the input unit 12 to select the one of the skill options 14. Then, the user may further move his/her hand to control movement of the cursor to move to one of the mode options 15, and click the enter button to select one of the practice mode and the evaluation mode corresponding to the one of the mode options 15. Afterward, the user may operate the input unit 12 to select a start button on the selection screen 13 in a similar manner. In another example, the above operations may be done using the D-pad and the enter button of the input unit 12.

Once selection of the one of the skill options 14 and the one of the mode options 15 is made in step 208, the wearable device 1 transmits a selection signal indicating the selection to the processor 2. In response to the selection signal, in step 210, the processor 2 accesses the storage unit 3 to load a selected one of the virtual reality modules that corresponds with the selection made by the user.

In step 212, the processor 2 controls the wearable device 1 to present the interactive data contained in the selected one of the virtual reality modules to the user in the form of a virtual environment (e.g., a virtual kitchen). Specifically, the processor 2 controls the wearable device 1 to present the interactive data contained in a selected one of the practice sub-module and the evaluation sub-module based on the selection made by the user in step 208.

Figure 3:
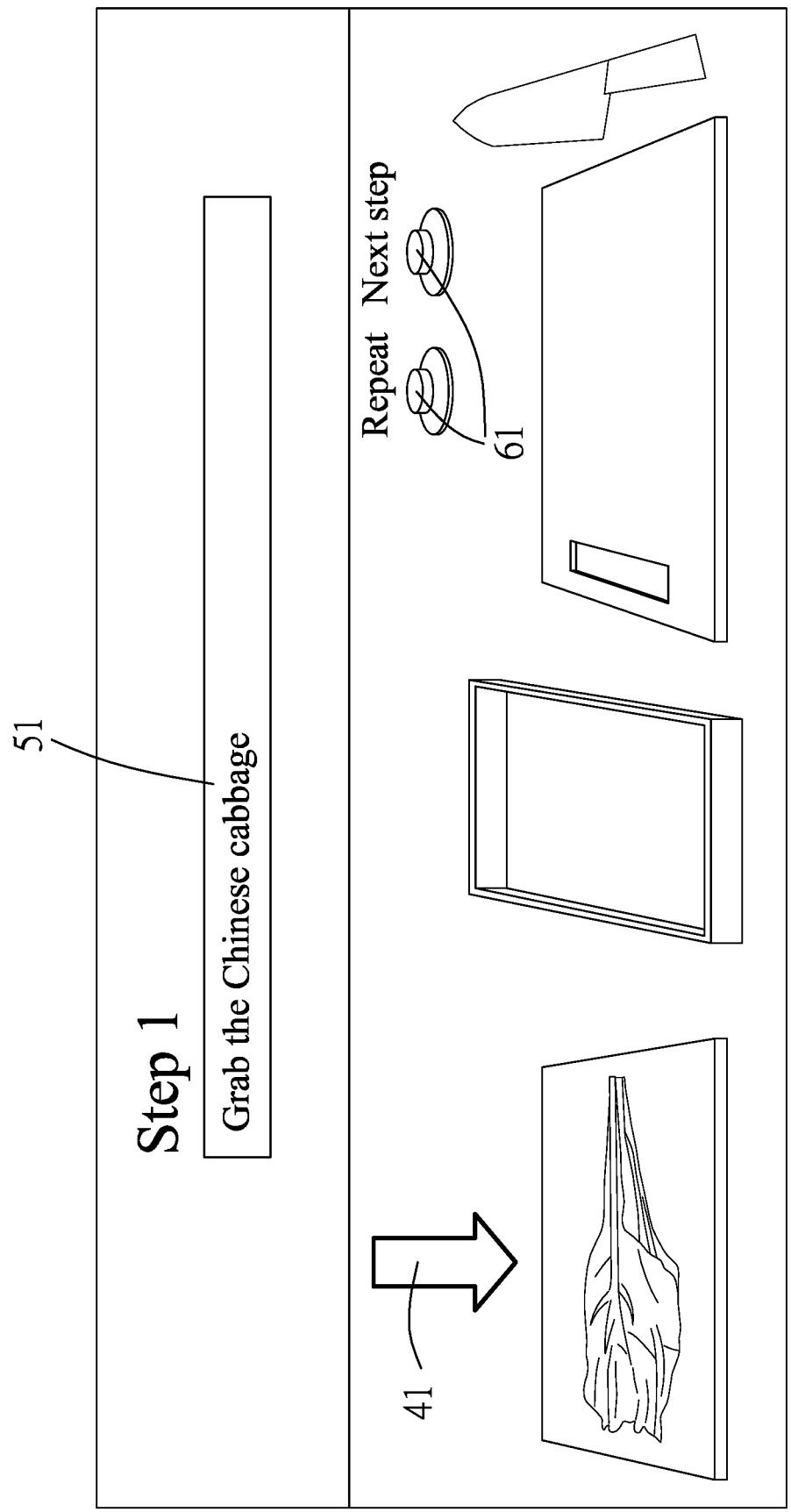
FIGS. 3 to 10 are schematic views illustrating displayed screens associated with a series of steps of a practice process.

FIG. 3 illustrates an example of interactive data that is presented to the user through the display unit 11. In the example of FIG. 3, the interactive data corresponds with preparing Chinese cabbage using the kitchen knife in the practice mode.

Specifically, the interactive data is presented to the user in the form of a virtual environment. The user is able to see a virtual cutting board, a virtual kitchen knife, and the scaffolding elements of the cognitive scaffolding network.

In the case of FIG. 3, the scaffolding elements include an arrow 41 pointing at an object (the virtual Chinese cabbage) and a text message 51 indicating a "Step 1" of a practice process related to preparing Chinese cabbage, and instructing the user to "pick up the Chinese cabbage". The virtual environment may also include buttons 61 for switching among various steps of the practice process of preparing Chinese cabbage (e.g., back to the previous step, repeat the current step, proceed to the next step, etc.). It is noted that the buttons 61 may be presented during each of the steps of the practice process for allowing the user to practice specific step(s) of the practice process.

Upon seeing the text message 51, the user may move his/her hand to "grab" the virtual Chinese cabbage. In response, the input unit 12 detects a hand gesture of the user, and generates a gesture signal corresponding with the hand gesture in step 214. The gesture signal is then transmitted to the processor 2.

In step 216, in response to receipt of the gesture signal from the input unit 12, the processor 2 generates an interactive gesture presentation based on the gesture signal.

Then, in step 218, the processor 2 controls the wearable device 1 to further present the interactive gesture presentation in the virtual environment.

For example, in the case of FIG. 3, when the user moves his/her hand to "grab" and "move" the virtual Chinese cabbage in the virtual environment, the interactive gesture presentation may be in the form of the virtual Chinese cabbage being moved according to the movement of the hand of the user.

Figure 4:
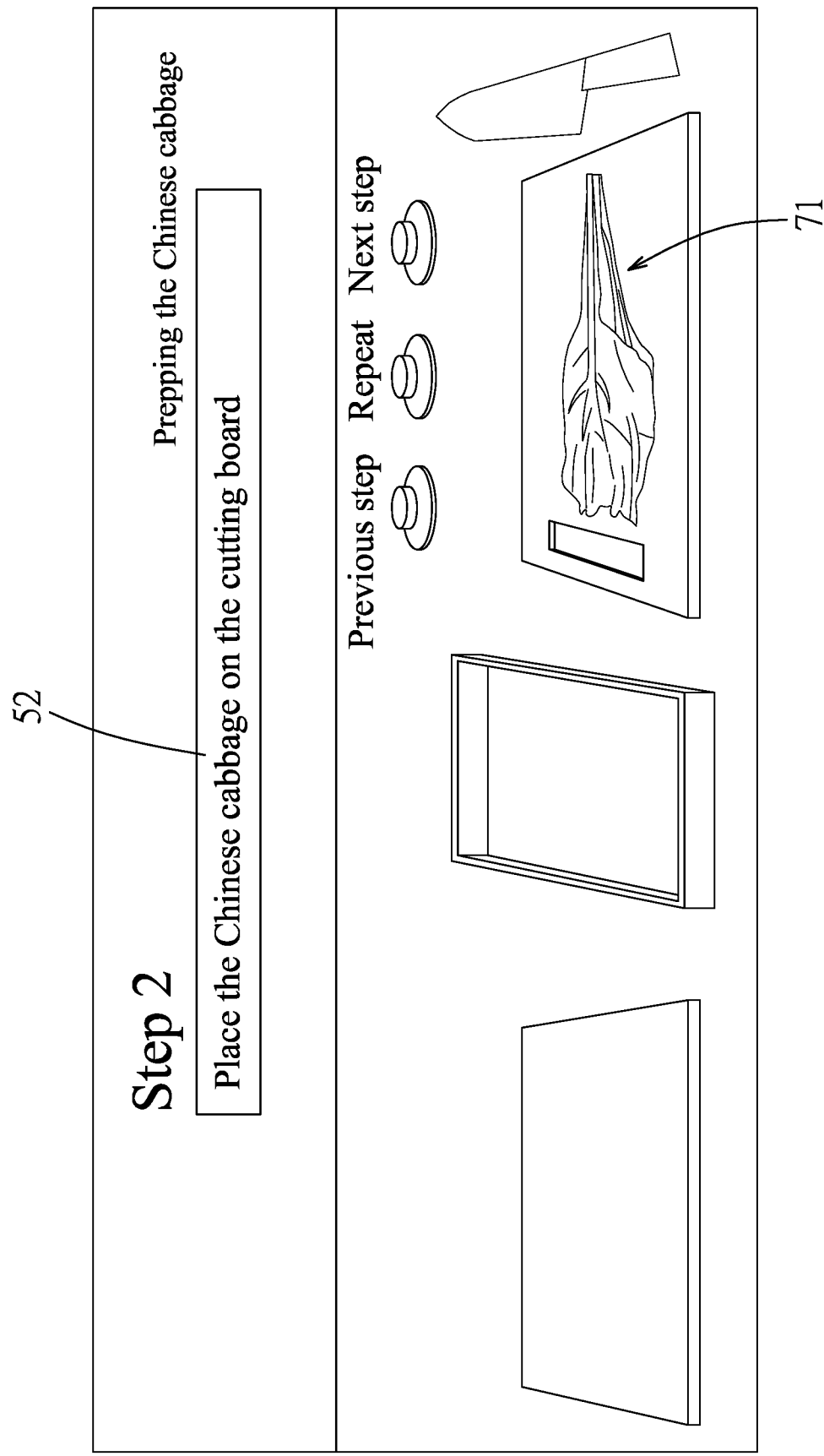

After the virtual Chinese cabbage is picked up, the practice process proceeds to "Step 2", and the text message 52 is displayed, instructing the user to put the virtual Chinese cabbage on the virtual cutting board (as shown in FIG. 4). An arrow 71 (instructing element) pointing at the virtual cutting board may be presented as a hint to the user.

Figure 5:
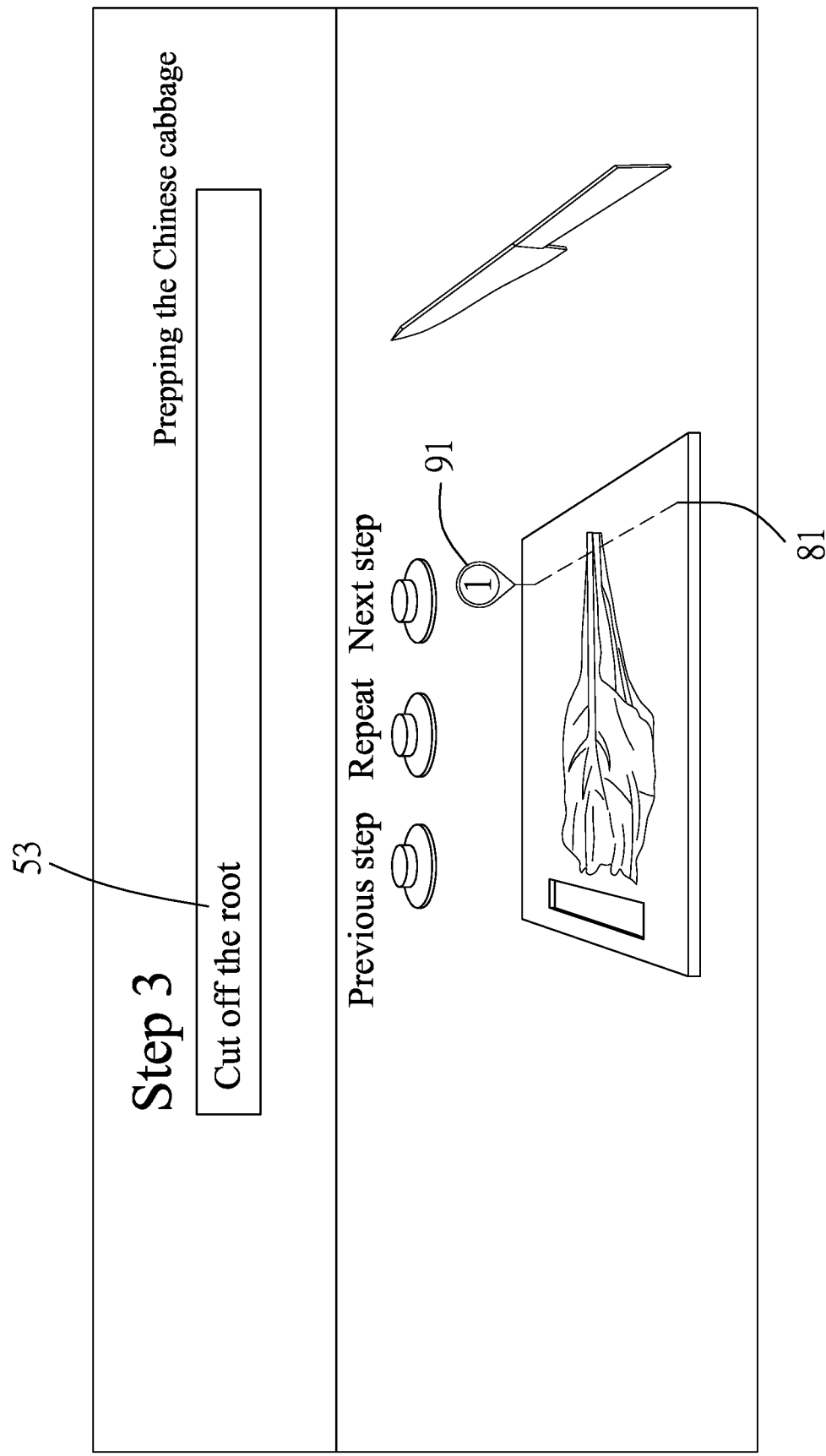

After the user puts the virtual Chinese cabbage on the virtual cutting board, the practice process proceeds to "Step 3", and the text message 53 is displayed, instructing the user to cut off a root portion of the virtual Chinese cabbage on the virtual cutting board (as shown in FIG. 5). In this case, additional scaffolding elements may be presented, such as a number cue 91 indicating an order of operation, and a dotted line 81 defining a line for the user to operate the virtual kitchen knife so as to "cut off" the root portion.

In this case, the user may be instructed to use his/her left hand to "hold" the virtual Chinese cabbage and use his/her right hand to operate the virtual kitchen knife. As such, one of the handheld devices included in the input unit 12 held by the user may serve as the virtual kitchen knife. That is, the location of the one of the handheld devices may be detected, and projected to the virtual environment as the location of the virtual kitchen knife. In some embodiments, the system 100 may include a camera (not shown in the drawings) that is configured to capture an image of the user, so as to be able to assist in detecting locations of the fingers of the user. In some embodiments, the input unit 12 may further include a glove (not shown in the drawings) that includes a motion detecting element for assisting in detecting locations of the fingers of the user.

Figure 6:
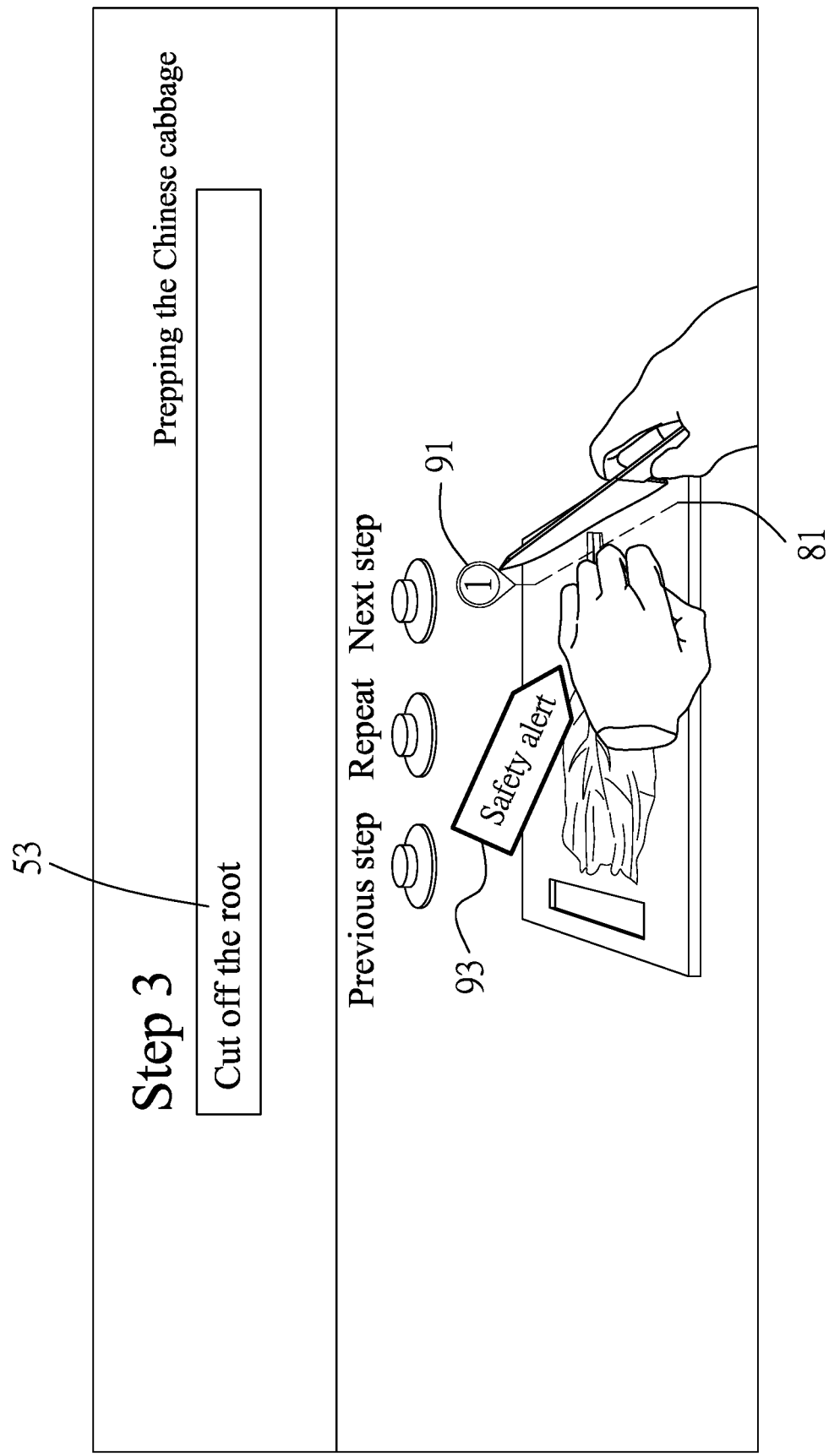

As such, when the user is operating the virtual kitchen knife, the processor 2 may determine whether his/her fingers are in potential risk (i.e., not bent inward, and therefore may be cut by the virtual kitchen knife), and control the display unit 11 to display a safety alert notice 93 as shown in FIG. 6. In such a case, the user may be warned against executing the cut until his/her fingers are moved away.

Figure 7:
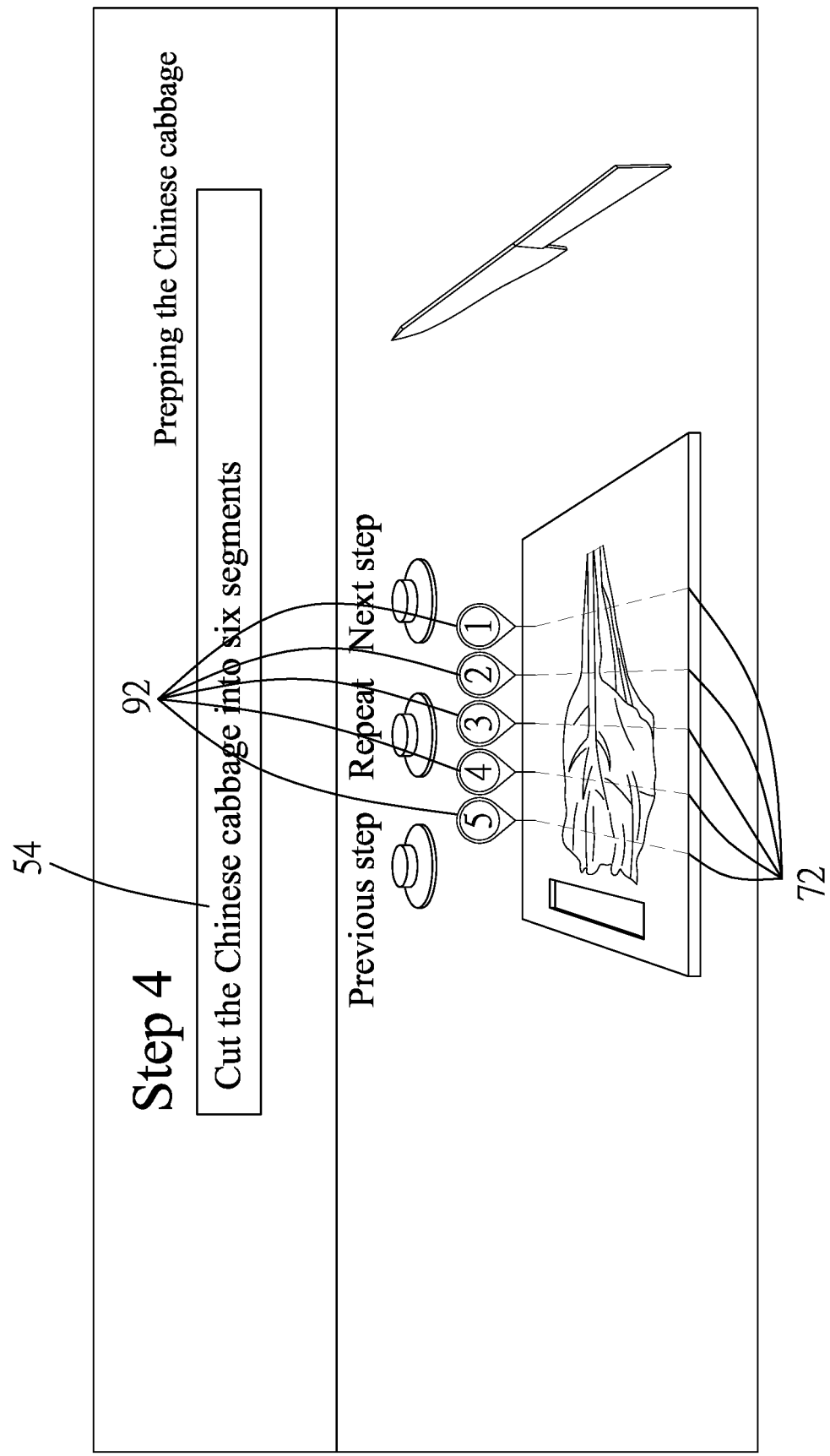

After the user cuts off the root portion of the virtual Chinese cabbage, the practice process proceeds to "Step 4", and the text message 54 is displayed, instructing the user to cut the virtual Chinese cabbage into six segments on the virtual cutting board (as shown in FIG. 7). Five number cues 92 indicating an order of operation, and five corresponding dotted lines 72 are displayed as additional scaffolding elements.

Figure 8:
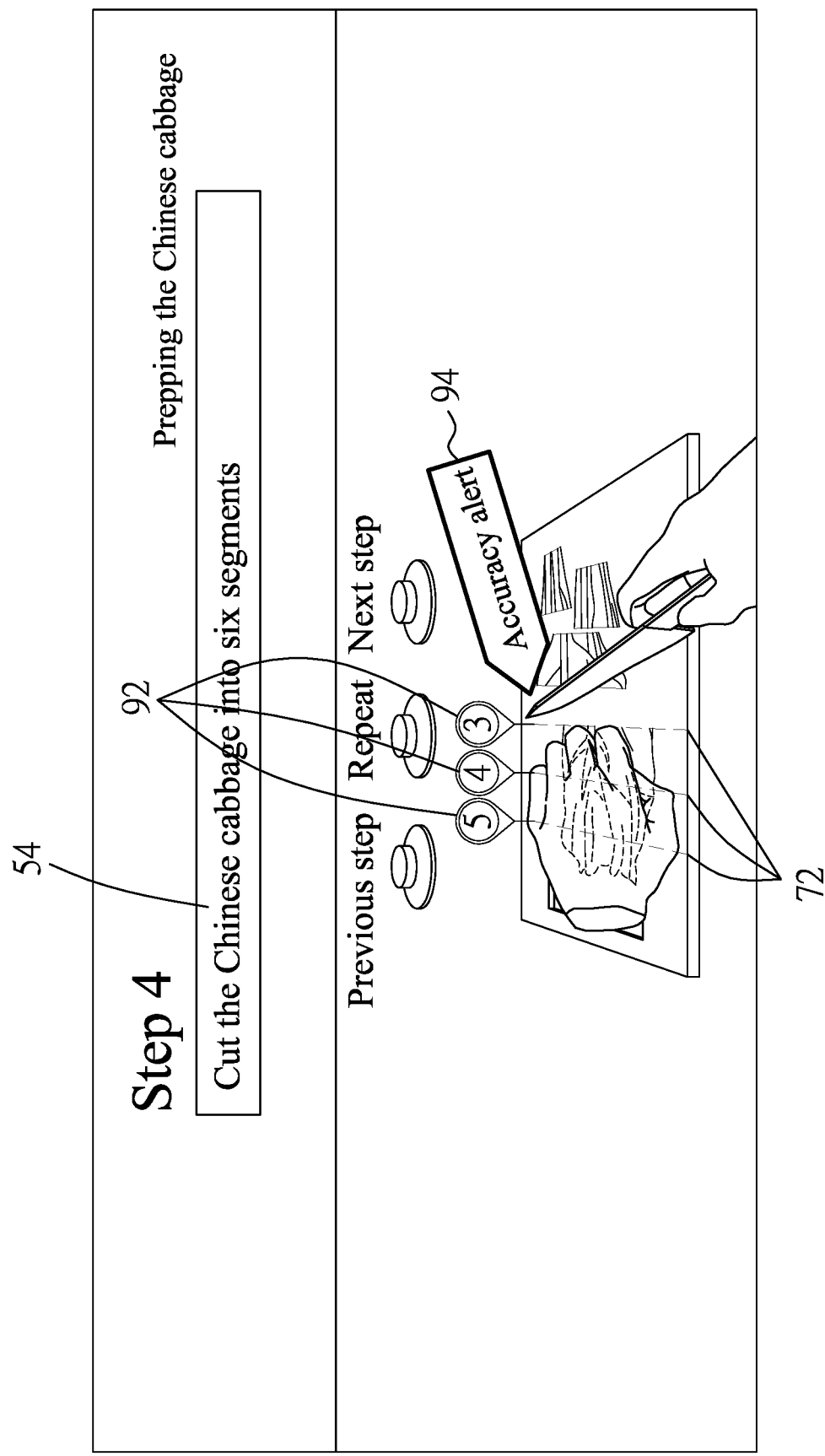

As the user practices, the input unit 12 may further detect an orientation of the hand holding the virtual kitchen knife (e.g., the right hand), so as to determine whether a cut to be made by the user aligns with a corresponding one of the dotted lines 72. When it is determined that the hand of the user is tilted with respect to the corresponding one of the dotted lines 72, the processor 2 may control the display unit 11 to display an accuracy alert notice 94 as shown in FIG. 8.

Figure 9:
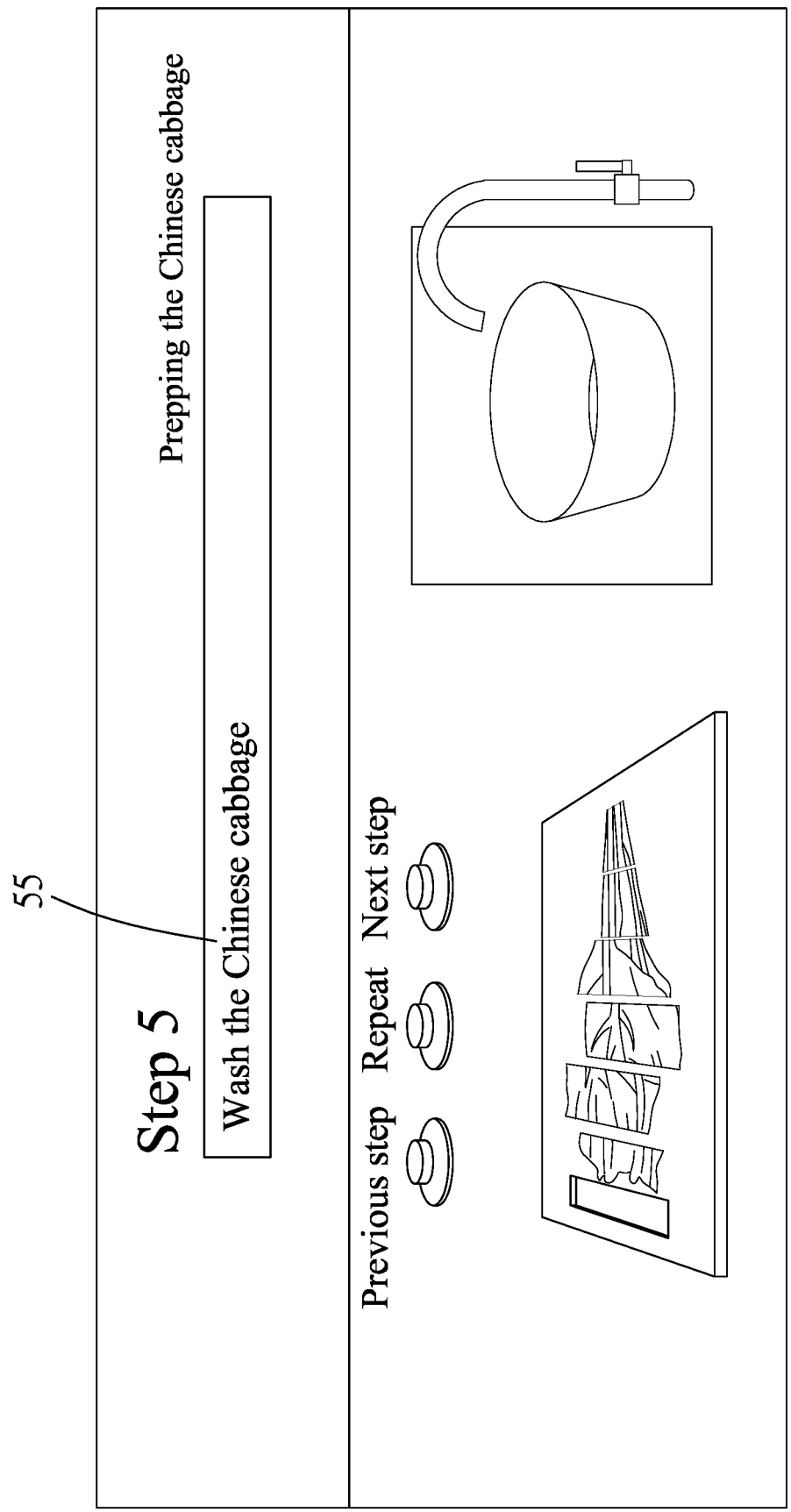
Figure 10:
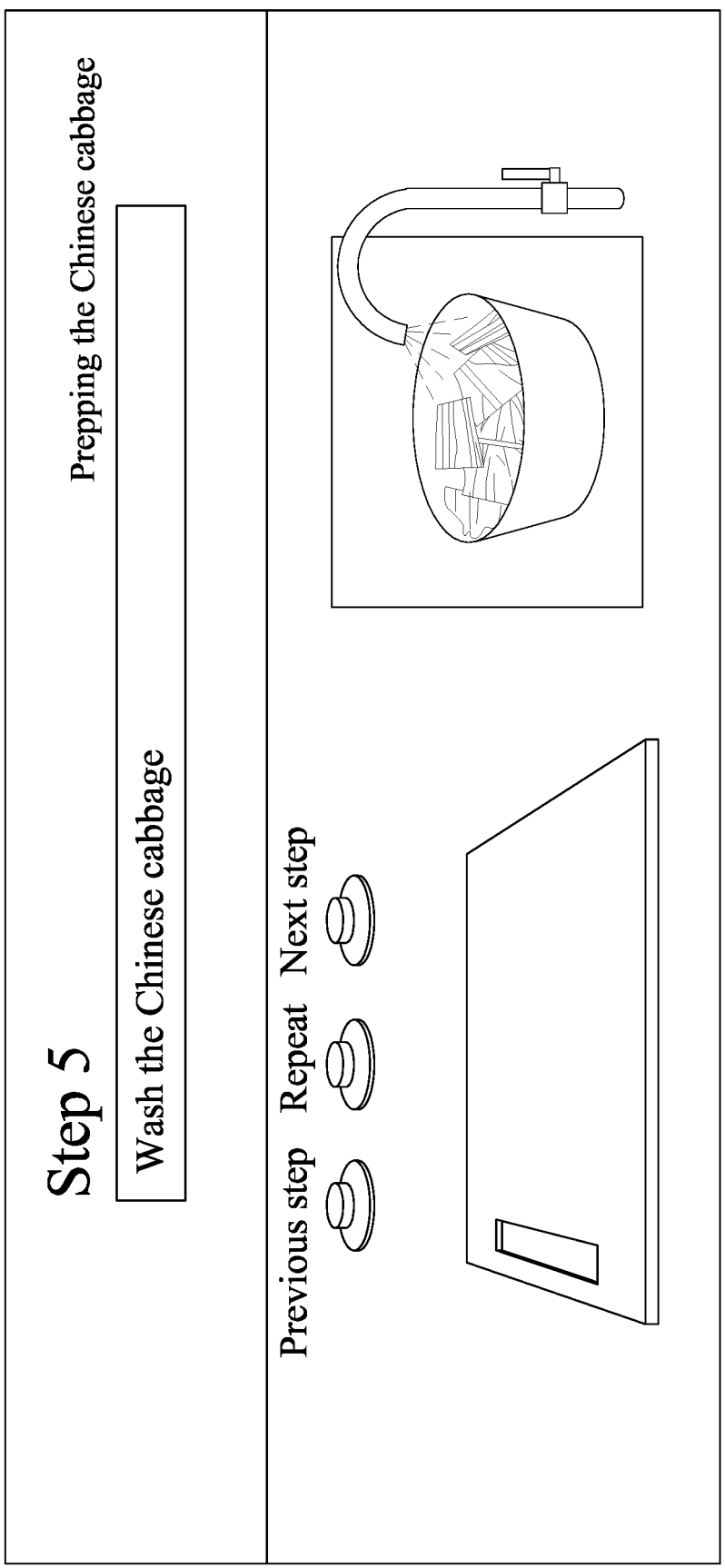

After the user finishes cutting the virtual Chinese cabbage, the practice process proceeds to "Step 5", and the text message 55 is displayed, instructing the user to wash the cut virtual Chinese cabbage in a water bowl (as shown in FIGS. 9 and 10). Additional steps of the practice process (e.g., putting the cleaned virtual Chinese cabbage into a basket, moving the basket to a specific location) may be implemented.

Apart from the above practice process of the practice mode, when the evaluation mode is selected in the selection screen of FIG. 2, the interactive data presented in step 212 does not include any one of the scaffolding elements in the virtual environment. That is, the user may be instructed to perform an evaluation process similar to the practice process, but without any assistance.

In such a case, when the user moves his/her hand to perform one of the steps of an evaluation process similar to the practice process, the input unit 12 may detect a hand gesture of the user, generate a gesture signal corresponding with the hand gesture, and transmit the gesture signal to the processor 2.

In response to receipt of the gesture signal from the input unit 12 in the evaluation process, the processor 2 may be configured to generate an evaluation result based on the gesture signal (e.g., whether the left fingers are bent, the cuts are made at correctly, etc.) to determine a result of the user learning the skill. The evaluation result may be in the form of a score or a public relation (PR) measurement, and may then be stored in the storage unit 3.

In one embodiment, one of the virtual reality modules is associated with auto detailing to be performed on an exterior of an automobile. In this embodiment, the skill options 14 may include operations such as washing alloy wheels, washing a car body, wax polishing, wiping the car body, etc.

It is noted that in this embodiment, when the practice mode is selected, one or more of the scaffolding elements may be presented during the practice process. When one of the steps of the practice process involves a potential safety issue, the processor 2 may control the display unit 11 to display the safety alert notice. For example, when the user operates a high-pressure washer gun, a distance between the high-pressure washer gun, which is spraying water at a high pressure, and the alloy wheels should be greater than a predetermined safety distance. When it is determined that the distance is smaller than the safety distance, the safety alert notice may be displayed. Additionally, the processor 2 may determine a location at which the water is sprayed based on the orientation of the hands of the user, and determine whether the location registers with a preset stain on a virtual car body. When it is determined that the location is not registered with the stain, the processor 2 may control the display unit 11 to display an accuracy alert notice.

To sum up, embodiments of the disclosure provide a method and a system for skill learning. The system is configured to present a virtual environment to the user, and therefore the user is allowed to practice the skill by interacting with the virtual objects in the virtual environment. This eliminates the time and location constrains associated with employing a conventional teacher. Additionally, for each of the skills, a practice mode and an evaluation mode are provided, such that the skill may be practiced with the assistance of the scaffolding elements, and after practicing, the scaffolding elements may be removed and the result of the learning may be evaluated.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for skill learning, implemented using a system including a wearable device worn by a user, a storage unit, and a processor communicating with the wearable device and the storage unit, the storage unit storing a plurality of virtual reality modules therein, each of the virtual reality modules containing interactive data associated with learning a skill, the wearable device including a display unit and an input unit, the method comprising:

accessing, by the processor, the storage unit to load a selected one of the virtual reality modules; and controlling, by the processor, the wearable device to present the interactive data contained in the selected one of the virtual reality modules to the user in the form of a virtual environment;

the method further comprising, after presenting the interactive data:

detecting, by the input unit, a hand gesture of the user and generating a gesture signal corresponding with the hand gesture;

in response to receipt of the gesture signal from the input unit, generating, by the processor, an interactive gesture presentation based on the gesture signal; and controlling, by the processor, the wearable device to further present the interactive gesture presentation in the virtual environment;

the method further comprising, prior to accessing the storage unit to load the selected one of the virtual reality modules:

controlling, by the processor, the wearable device to present a selection screen, the selection screen including a plurality of skill options each corresponding with a skill, and a plurality of mode options each corresponding with an operation mode; and in response to receipt of a selection signal indicating one of the skill options and one of the mode options, transmitting, by the input unit, the selection signal to the processor;

wherein:

the processor loads a selected one of the virtual reality modules based on the selection signal;

one of the mode options corresponds with a practice mode;

the selected one of the virtual reality modules includes a practice sub-module corresponding with the practice mode, the practice sub-module containing interactive data that includes a cognitive scaffolding network, the cognitive scaffolding network including a plurality of scaffolding elements; and when the practice mode is selected, the step of presenting the interactive data includes presenting at least one of the scaffolding elements in the virtual environment, and the scaffolding elements include a number cue indicating an order of operation, and one or more of an arrow, a broken line, a text message, and a visual cue.

2. The method of claim 1, wherein:

one of the mode options corresponds with an evaluation mode;

the selected one of the virtual reality modules includes an evaluation sub-module corresponding with the evaluation mode; and when the evaluation mode is selected, the step of presenting the interactive data includes not presenting the scaffolding elements in the virtual environment.

3. The method of claim 2, further comprising, after presenting the interactive data:

in response to receipt of the gesture signal from the input unit in the evaluation mode, generating, by the processor, an evaluation result based on the gesture signal.

4. The methods of claim 3, further comprising storing the evaluation result in the storage unit.

5. The method of claim 1, wherein one of the virtual reality modules is associated with preparing food on a cutting board using a kitchen knife.

6. The method of claim 1, wherein one of the virtual reality modules is associated with auto detailing to be performed on an exterior of an automobile.

7. A system for skill learning, comprising:

a wearable device to be worn by a user;

a storage unit storing a plurality of virtual reality modules therein, each of the virtual reality modules containing interactive data associated with learning a skill; and a processor communicating with said wearable device and said storage unit, wherein said processor is configured to:

access said storage unit to load a selected one of the virtual reality modules; and control said wearable device to present the interactive data contained in the selected one of the virtual reality modules to the user in the form of a virtual environment;

wherein:

said wearable device includes a display unit and an input unit;

after presenting the interactive data, said input unit is configured to detect a hand gesture of the user and generate a gesture signal corresponding with the hand gesture;

in response to receipt of the gesture signal from the input unit, said processor generates an interactive gesture presentation based on the gesture signal, and controls said wearable device to further present the interactive gesture presentation in the virtual environment;

wherein, prior to accessing said storage unit to load the selected one of the virtual reality modules:

said processor controls said wearable device to present a selection screen, the selection screen including a plurality of skill options each corresponding with a skill, and a plurality of mode options each corresponding with an operation mode; and in response to receipt of a selection signal indicating one of the skill options and one of the mode options, said input unit transmits the selection signal to the processor;

wherein said processor loads a selected one of the virtual reality modules based on the selection signal;

wherein, prior to accessing said storage unit to load the selected one of the virtual reality modules:

said processor controls said wearable device to present a selection screen, the selection screen including a plurality of skill options each corresponding with a skill, and a plurality of mode options each corresponding with an operation mode; and in response to receipt of a selection signal indicating one of the skill options and one of the mode options, said input unit transmits the selection signal to the processor;

wherein said processor loads a selected one of the virtual reality modules based on the selection signal;

wherein:
one of the mode options corresponds with a practice mode;
the selected one of the virtual reality modules includes a practice sub-module corresponding with the practice mode, the practice sub-module containing interactive data that includes a cognitive scaffolding network, the cognitive scaffolding network including a plurality of scaffolding elements; and
when the practice mode is selected, said processor further controls said wearable device to present at least one of the scaffolding elements in the virtual environment, and the scaffolding elements include a number cue indicating an order of operation, and one or more of an arrow, a broken line, a text message, and a visual cue.

8. The system of claim 7, wherein:
one of the mode options corresponds with an evaluation mode;
the selected one of the virtual reality modules includes an evaluation sub-module corresponding with the evaluation mode; and
when the evaluation mode is selected, said processor further controls said wearable device to not present the scaffolding elements in the virtual environment.

9. The system of claim 8, wherein, after presenting the interactive data, in response to receipt of the gesture signal from said input unit in the evaluation mode, said processor generates an evaluation result based on the gesture signal.

10. The system of claim 9, wherein said processor further stores the evaluation result in said storage unit.

11. The system of claim 7, wherein one of the virtual reality modules is associated with preparing food on a cutting board using a kitchen knife.

12. The system of claim 7, wherein one of the virtual reality modules is associated with auto detailing to be performed on an exterior of an automobile.

* * * * *